(12) United States Patent
Moldvai

(10) Patent No.: US 7,760,961 B2
(45) Date of Patent: Jul. 20, 2010

(54) ADAPTIVE CONTRAST ENHANCEMENT

(76) Inventor: Caba Moldvai, 10704 Ian La., Dublin, CA (US) 94568

( * ) Notice: Subject to any disclaimer, the term of this patent is extended or adjusted under 35 U.S.C. 154(b) by 1021 days.

(21) Appl. No.: 11/044,755

(22) Filed: Jan. 26, 2005

(65) Prior Publication Data

US 2006/0083425 A1   Apr. 20, 2006

Related U.S. Application Data

(60) Provisional application No. 60/619,518, filed on Oct. 15, 2004.

(51) Int. Cl.
*G06K 9/40* (2006.01)
(52) U.S. Cl. .................. 382/274; 382/254; 382/162
(58) Field of Classification Search ........... 382/274, 382/270, 168; 345/20, 63, 77, 618, 619, 345/589; 348/254
See application file for complete search history.

(56) References Cited

U.S. PATENT DOCUMENTS

| | | | | |
|---|---|---|---|---|
| 4,792,979 | A * | 12/1988 | Nomura et al. | 382/169 |
| 5,450,502 | A * | 9/1995 | Eschbach et al. | 382/169 |
| 5,828,793 | A | 10/1998 | Mann | |
| 5,949,918 | A | 9/1999 | McCaffrey | |
| 6,163,621 | A * | 12/2000 | Paik et al. | 382/169 |
| 6,239,782 | B1 | 5/2001 | Siegel | |
| 6,594,388 | B1 * | 7/2003 | Gindele et al. | 382/167 |
| 6,650,664 | B1 * | 11/2003 | Moore et al. | 372/6 |
| 6,738,527 | B2 | 5/2004 | Kuwata | |
| 6,778,183 | B1 | 8/2004 | Nair | 345/589 |
| 7,034,843 | B2 | 4/2006 | Nair et al. | |
| 7,050,114 | B2 | 5/2006 | Stessen et al. | |
| 7,116,838 | B2 * | 10/2006 | Gindele et al. | 382/260 |
| 7,127,123 | B2 | 10/2006 | Wredenhagen | |
| 7,221,807 | B2 | 5/2007 | Campbell | |

(Continued)

FOREIGN PATENT DOCUMENTS

EP    0424920 A2 *   2/1991

(Continued)

OTHER PUBLICATIONS

Sang-Yeon Kim; Dongil Han; Seung-Jong Choi; Jong-Seok Park; Image contrast enhancement based on the piecewise-linear approximation of CDF. Consumer Electronics, IEEE Transactions on Aug. 1999. vol. 45, Issue 3, pp. 828-834.*

(Continued)

*Primary Examiner*—Vikkram Bali
*Assistant Examiner*—Julian D Brooks
(74) *Attorney, Agent, or Firm*—Christensen O'Connor Johnson Kindness PLLC

(57) ABSTRACT

Disclosed is a method for generating transfer curves for adaptive contrast enhancement. Given an input image, a luminance histogram is generated based on a set of predefined input luminance ranges. The luminance histogram is then expressed as a weighted sum of a set of predefined "primitive" histograms. Each primitive histogram has an associated reference transfer curve. A final transfer curve is produced as a corresponding weighted sum of the associated reference transfer curves. The image luminance can then be adjusted according the to the final transfer curve, resulting in enhanced image contrast. The disclosed method enables expansion of the number of available reference transfer curves without increasing the number of luminance ranges.

20 Claims, 7 Drawing Sheets

U.S. PATENT DOCUMENTS

| | | | |
|---|---|---|---|
| 2002/0025079 A1* | 2/2002 | Kuwata et al. | 382/254 |
| 2002/0101432 A1 | 8/2002 | Ohara et al. | |
| 2003/0117654 A1* | 6/2003 | Wredenhagen et al. | 358/3.21 |
| 2003/0161549 A1 | 8/2003 | Lei et al. | |
| 2003/0185457 A1* | 10/2003 | Campbell | 382/254 |
| 2004/0008903 A1 | 1/2004 | Kim | 382/274 |

FOREIGN PATENT DOCUMENTS

| | | |
|---|---|---|
| EP | 0 648 040 | 4/1995 |
| EP | 0366 099 B1 | 1/1996 |
| EP | 0772158 A2 * | 6/1997 |
| EP | 1418543 A2 * | 5/2004 |

OTHER PUBLICATIONS

Yu, T.-H.; Mitra, S.K.; Histogram-shape preserving algorithm for image enhancement Circuits and Systems, 1993., ISCAS '93, 1993 IEEE International Symposium on May 3-6, 1993. vol. 1 pp. 407-410.*

Stark, J.A.; Adaptive image contrast enhancement using generalizations of histogram equalization. Image Processing, IEEE Transactions on May 2000. vol. 9, Issue 5, pp. 889-896.*

"Hardware: Def 2a." Webster's II New Riverside University Dictionary. Riverside Publishing Company. 1984.*

Carbonaro et al., "A Comprehensive Approach to Image-Contrast Enhancement," Proceedings of the International Conference on Image Analysis and Processing, 1999, Sep. 27-29, 1999, pp. 241-246.

Australian Written Opinion dated Oct. 10, 2006 in corresponding Singapore Application No. 200506565-1.

"Histogram Equalization," Wikipedia, <http://en/wikipedia.org/wiki/Histogram_equalization> [retrieved on Jan. 30, 2009] 6 pages.

Chinese Office Action dated Mar. 7, 2008 from Chinese Application No. 200510124980.7.

Office Action dated Dec. 12, 2007 in U.S. Appl. No. 11/044,774.

Australian Written Opinion dated Oct. 10, 2006 in Singapore Application No. 200506565-1.

Office Action dated May 1, 2008 in U.S. Appl. No. 11/044,774.

International Search Report dated Nov. 23, 2007 from EP Application No. 05256354.1.

Search Report dated May 9, 2008 in Singapore Patent Application No. 200506563-6.

Chinese Office Action dated Sep. 19, 2008 from Chinese Application No. 200510124943.6.

European Search Report mailed Dec. 5, 2008, issued in corresponding Application No. EP 05256355.8, filed Oct. 13, 2005.

Kim, Y.-T., "Contrast Enhancement Using Brightness Preserving Bi-Histogram Equalization," IEEE Transactions on Consumer Electronics 43(1):Feb. 1-8, 1997.

Notice of Allowance dated Apr. 10, 2009, from U.S. Appl. No. 11/044,774, filed Jan. 26, 2005.

* cited by examiner

ADAPTIVE CONTRAST ENHANCEMENT

BACKGROUND OF THE INVENTION

The present invention relates generally to contrast enhancement and, more particularly, to a method for using primitive transfer curves to generate transfer curves for adaptive contrast enhancement.

Traditional contrast adjustment methods in displays and TVs do not take into account the input image content and result in unintended average brightness shifts as well as saturation or clipping. For example, poor results are obtained when increasing the contrast on an image which already has good contrast, and poor contrast is obtained when the image has a large portion of very bright or very dark pixels. Similarly, decreasing the contrast will typically "black out" images that already have poor contrast.

Therefore, improved contrast enhancement techniques are desired.

SUMMARY OF THE INVENTION

What is provided, therefore, is an adaptive contrast enhancement method that allows expansion of the number of available reference transfer curves without increasing the number of luminance ranges. Given an input image, a luminance histogram is generated. The luminance histogram is then expressed as a weighted sum of a set of predefined "primitive" histograms. Each primitive histogram has an associated reference transfer curve. A final transfer curve is produced as a corresponding weighted sum of the associated reference transfer curves. The image luminance can then be adjusted according the to the final transfer curve, resulting in enhanced image contrast.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to a particular embodiment of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

When preparing an image for presentation, for example on a display such as a Liquid Crystal Display (LCD), an Organic Light Emitting Diode (OLED) screen, a Digital Light Processor (DLP), a Cathode Ray Tube (CRT), a plasma panel or other type of display, it is desirable to enhance the contrast of the image by adjusting pixel luminance levels. A transfer curve can be used for describing a mapping between input luminance levels and output luminance levels. Since different images have different luminance histograms, it is desirable to tailor the transfer curve to the particular image at hand in order to obtain optimal contrast enhancement.

One approach is to divide the luminance spectrum into a number of luminance ranges each associated with a reference transfer curve, sum the reference transfer curves proportional to the representation of their luminance ranges in the image, and use the sum as a transfer curve for processing the image luminance. While this approach works well, improving contrast enhancement by expanding the number of available reference transfer curves requires an increase in the number of luminance ranges, thereby adding boundary cases and producing uneven contrast enhancement during fade-ins and fade-outs (e.g. in a video stream). It is therefore desirable to expand the number of available reference transfer curves without increasing the number of predefined luminance ranges.

Accordingly, the present invention expands the number of available reference transfer curves without increasing the number of luminance ranges. First, a luminance histogram is generated for the image at hand. Then, the luminance histogram is expressed as a weighted sum of a set of predefined "primitive" histograms. The number of primitive histograms is larger than the number of luminance ranges, but the number of primitive histograms needed to adequately approximate the luminance histogram is generally smaller than the total number of available primitive histograms. Each primitive histogram has an associated reference transfer curve. A final transfer curve is produced as a corresponding weighted sum of the associated reference transfer curves. The image luminance can then be processed according to the final transfer curve, resulting in enhanced image contrast.

Figure 1A:
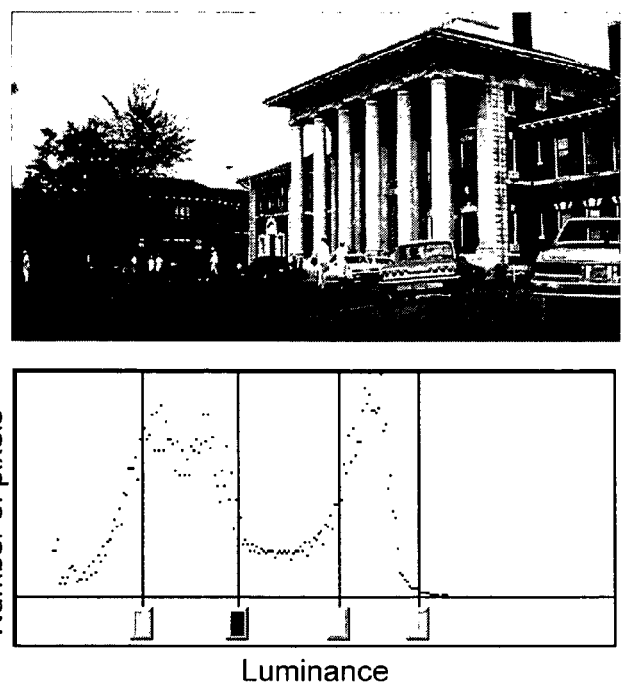
FIG. 1a shows an example medium-bright image and a histogram for the image, in accordance with an embodiment of the present invention.
Figure 1B:
FIG. 1b shows an example dark (low-brightness) image and a histogram for the image, in accordance with an embodiment of the present invention.
Figure 1B:
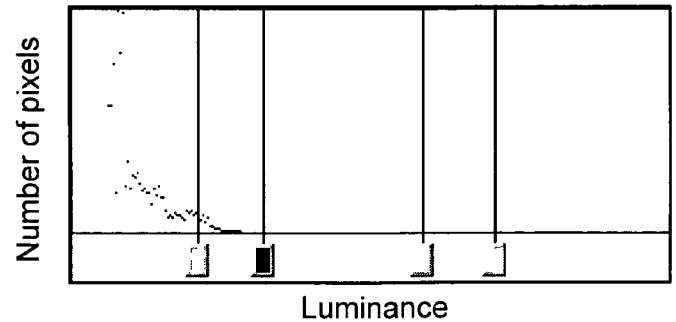

FIG. 1a shows an example medium-bright image and a histogram for the image, and FIG. 1b shows an example dark (low-brightness) image and a histogram for the image. The horizontal axes of the histograms represent luminance values and the vertical axes represent the number of pixels having a given luminance value. For example, for the dark scene in FIG. 1b, the luminance histogram indicates that most of the pixels have low luminance, while for the medium-bright scene in FIG. 1a the luminance histogram indicates a larger number of brighter pixels.

The invention will now be described using an example of three luminance ranges dividing the image luminance spectrum. It should be noted, however, that the following description is exemplary in nature and should therefore not be construed as limiting either the scope or intent of the invention.

Figure 1C:
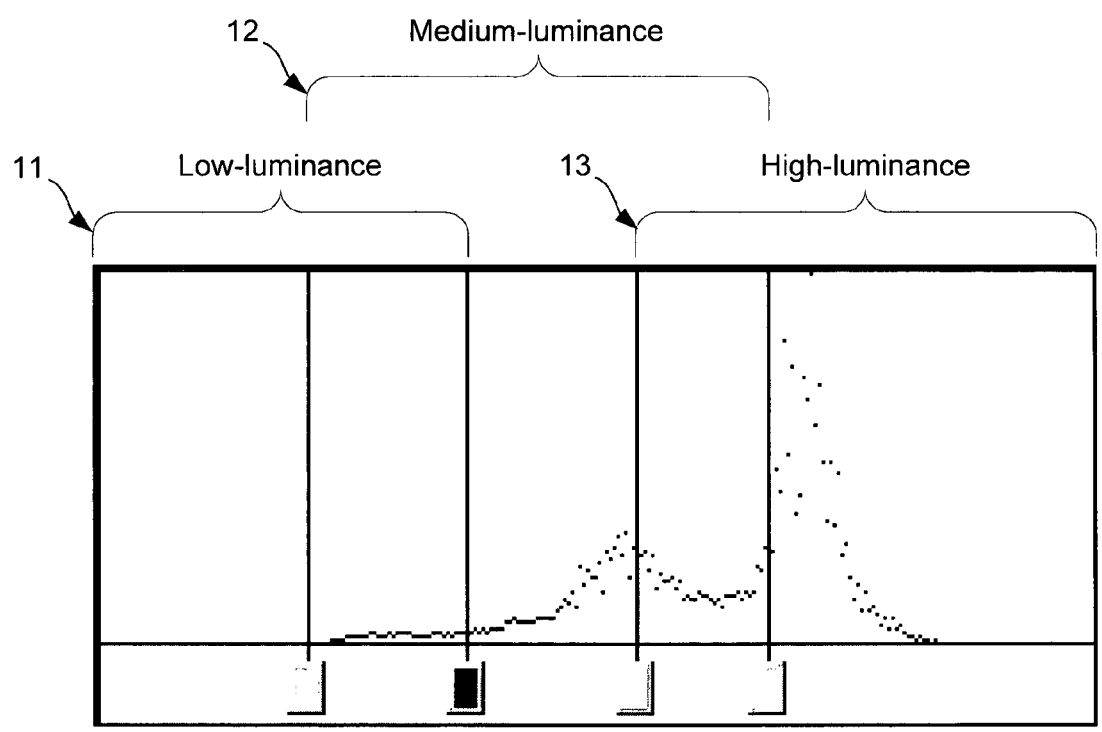
FIG. 1c shows three example luminance ranges, in accordance with an embodiment of the present invention.

In the present description, three example luminance ranges are used: a low-luminance range, a medium-luminance range and a high-luminance range. FIG. 1c shows three example luminance ranges 11, 12 and 13, in accordance with an embodiment of the present invention. The luminance ranges are user-definable and may be chosen to overlap in order to provide for smooth contrast enhancement. By way of example, a low-luminance range of 0% to 40%, a medium-luminance range of 30% to 70%, and a high-luminance range of 60% to 100% luminance have been found to work well.

Figure 2A:
FIG. 2a shows an example image.
Figure 2B:
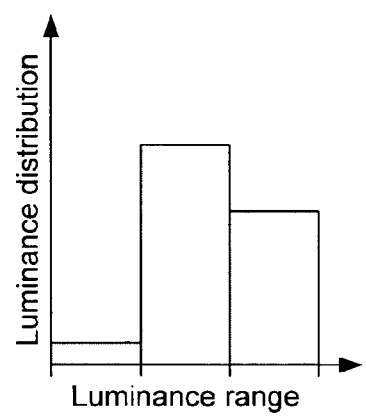
FIG. 2b shows a luminance histogram for the example image generated based on the three example luminance ranges.

Once the luminance ranges are defined, generating a luminance histogram for the purposes of the present invention corresponds to counting the number of image pixels in each of the luminance ranges. In the example case of three luminance ranges, such a histogram can be visualized as having three bars, each bar representing the proportion of image pixels in a particular luminance range. FIG. 2a shows an example image, and FIG. 2b shows a luminance histogram for the example image generated based on the three luminance ranges. The generation of image luminance histograms is preferably done in hardware such as a computer or other programmed device, although it should be appreciated that this can also be done partially or entirely in software or other computing layer.

Figure 3:
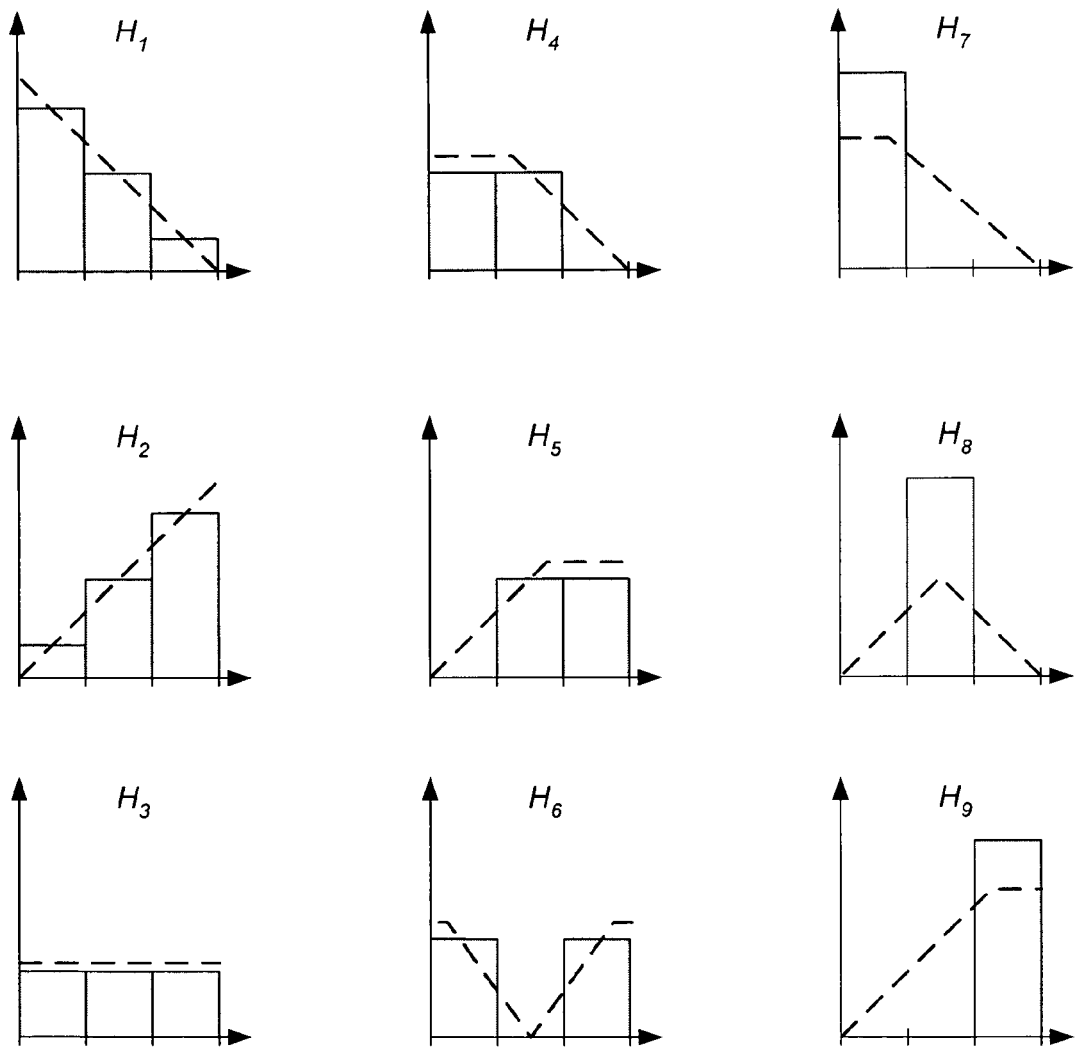
FIG. 3 shows an example set of nine primitive histograms $H_1, \ldots, H_9$, in accordance with an embodiment of the present invention.

After generating a luminance histogram (hereinafter referred to as the source histogram) for an input image, the goal is to express the source histogram as a weighted sum of a set of predefined primitive histograms. FIG. 3 shows an example set of nine primitive histograms $H_1, \ldots, H_9$, in accordance with an embodiment of the present invention. $H_1$ can be described as dark with the darkness monotonically falling, $H_2$ as bright with the brightness monotonically rising, $H_3$ as uniformly bright, $H_4$ as dark without distinct bright details, $H_5$ as bright without distinct dark details, $H_6$ as distinct dark and bright regions, $H_7$ as very dark, $H_8$ as medium bright, and $H_9$ as very bright.

The source histogram can be expressed as a weighted sum of two or more primitive histograms (with positive weights). The weighted sum may not match the source histogram exactly, but it will closely resemble the source histogram. One greedy algorithm for generating such a weighted sum is to choose a first primitive histogram which, when appropriately weighted using a maximal positive weight, leaves the smallest difference with the source histogram. The remaining difference (if any) between the source histogram and the first weighted primitive histogram is then similarly diminished by choosing a second primitive histogram which, when appropriately weighted using a maximal positive weight and added to the first weighted primitive histogram, leaves the smallest difference between the weighted sum and the source histogram.

By way of example, assuming that $H_1$ and $H_5$ were chosen among all the primitive histograms to serve as the first and second primitive histograms in the above algorithm, their weighted sum can be written as $w_1 \cdot H_1 + w_2 \cdot H_5$, with $w_1$ and $w_2$ representing the appropriately chosen positive weights. Optionally, the above algorithm can be continued to include additional primitive histograms for producing a weighted sum of three or more primitive histograms. It is contemplated that a weighted sum of two or three primitive histograms will approximate source histograms closely enough to enable a highly enhanced image contrast.

Another heuristic for generating a weighted sum of primitive histograms for the image first generates a preliminary histogram for the image using only two bins, with the first bin representing the lower half of the luminance spectrum and the second bin representing the higher half. The preliminary histogram is then used to indicate whether the image has low-luminance (first bin contains significantly more pixels than second bin), medium-luminance (first and second bins contain about the same number of pixels) or high-luminance (second bin contains significantly more pixels than second bin). The threshold can be defined explicitly. For example, if the less represented bin contains 45% of the pixels, the image is declared to have medium-luminance, else the image is declared low-luminance or high-luminance. For a low-luminance image, the high-luminance primitive histograms $H_2$ and $H_9$ are excluded from consideration for the weighted sum. For a high-luminance image, the low-luminance histograms $H_1$ and $H_7$ are excluded. For a medium-luminance image, the low-luminance and high-luminance primitive histograms $H_2$, $H_9$, $H_1$ and $H_7$ are excluded. The source histogram is then expressed as a weighted sum of the non-excluded primitive histograms using the above greedy algorithm.

The primitive histograms are preferably chosen and added by firmware for improved performance, although it should be appreciated that this can also be done fully or partially in software or other computing layer.

Once an appropriate weighted sum of primitive histograms is obtained, a final transfer curve is generated. Corresponding to the primitive histograms, . . . , are user-defined reference transfer curves, . . . , wherein represents a reference transfer curve generated to be suitable for enhancing the contrast of an image whose histogram resembles the primitive histogram. By way of example, U.S. patent application Ser. No. 11/044,774, entitled "Method of Generating Transfer Curves for Adaptive Contract Enhancement" and incorporated herein by reference, describes one way of generating transfer curves suitable for such histograms, wherein bright pixels are made brighter in generally dark or medium-bright images, and dark pixels are made darker in generally bright or medium-bright images.

Figure 5A:
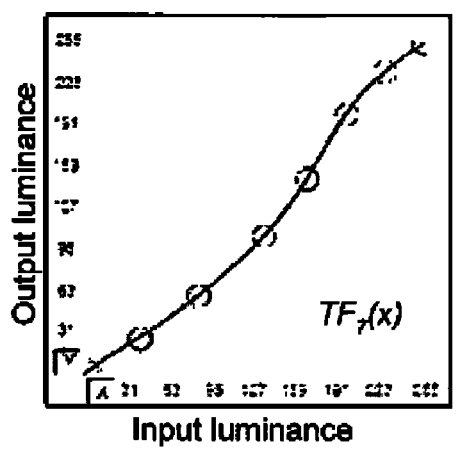
FIGS. 5a, 5b and 5c illustrate three example reference transfer curves $TF_7(x)$, $TF_8(x)$ and $TF_9(x)$ corresponding to the three primitive histograms $H_7$, $H_8$ and $H_9$, in accordance with an embodiment of the present invention.
Figure 5B:
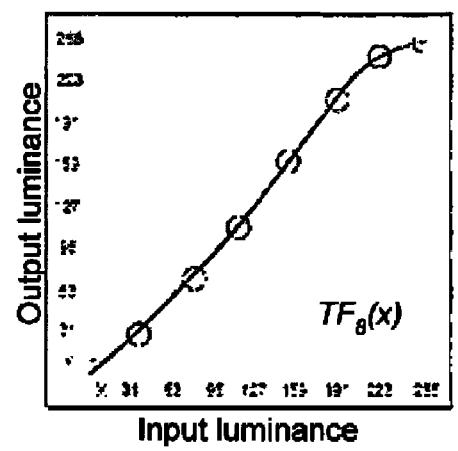
Figure 5C:
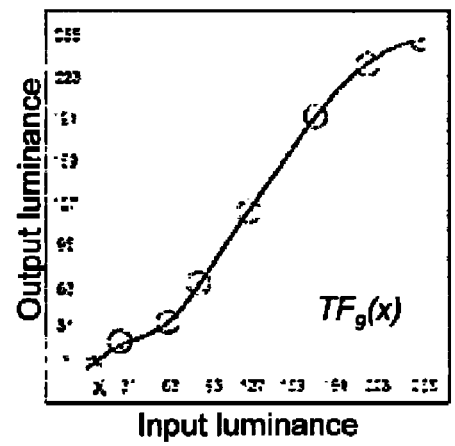

By way of example, FIGS. 5a, 5b and 5c illustrate three such example reference transfer curves $TF_7(x)$, $TF_8(x)$ and $TF_9(x)$, corresponding to the primitive histograms $H_7$, $H_8$ and $H_9$, in accordance with an embodiment of the present invention. Note that $TF_7(x)$ decreases the luminance in the dark regions of the image without substantially changing the luminance in the medium- and high-luminance regions; $TF_9(x)$ increases luminance in the bright regions of the image without substantially changing the luminance in the medium- and low-luminance regions; and $TF_8(x)$ increases the luminance in the high-luminance regions and decreases the luminance in the low-luminance regions without substantially changing the luminance in the medium-luminance range of the image.

The final transfer curve $T(x)$ is produced as a weighted sum of the corresponding reference transfer curves: $T(x) = w_1 \cdot TF_1(x) + w_2 \cdot TF_5(x)$. The weights used to produce the final transfer curve correspond to the weights used for the primitive histograms. The final transfer curve $T(x)$ can then be used to adjust the pixel luminances of the image, thereby enhancing the contrast of the image.

In general, the number of primitive histograms used in a weighted sum, and therefore the number of reference transfer curves used in a corresponding weighted sum, can be limited to two or three per weighted sum. However, the above examples are for illustration purposes only. There can be any number of primitive histograms $H_i$ and corresponding reference transfer curves $T_i(x)$ to choose from, any number of primitive histograms can be chosen for inclusion in the weighted sum $$\sum_i w_i \cdot H_i$$

for approximating the source histogram, and any corresponding number of reference transfer curves can be chosen for inclusion in the weighted sum $$\sum_i w_i \cdot T_i(x)$$

representing the final transfer curve T(x).

Figure 6:
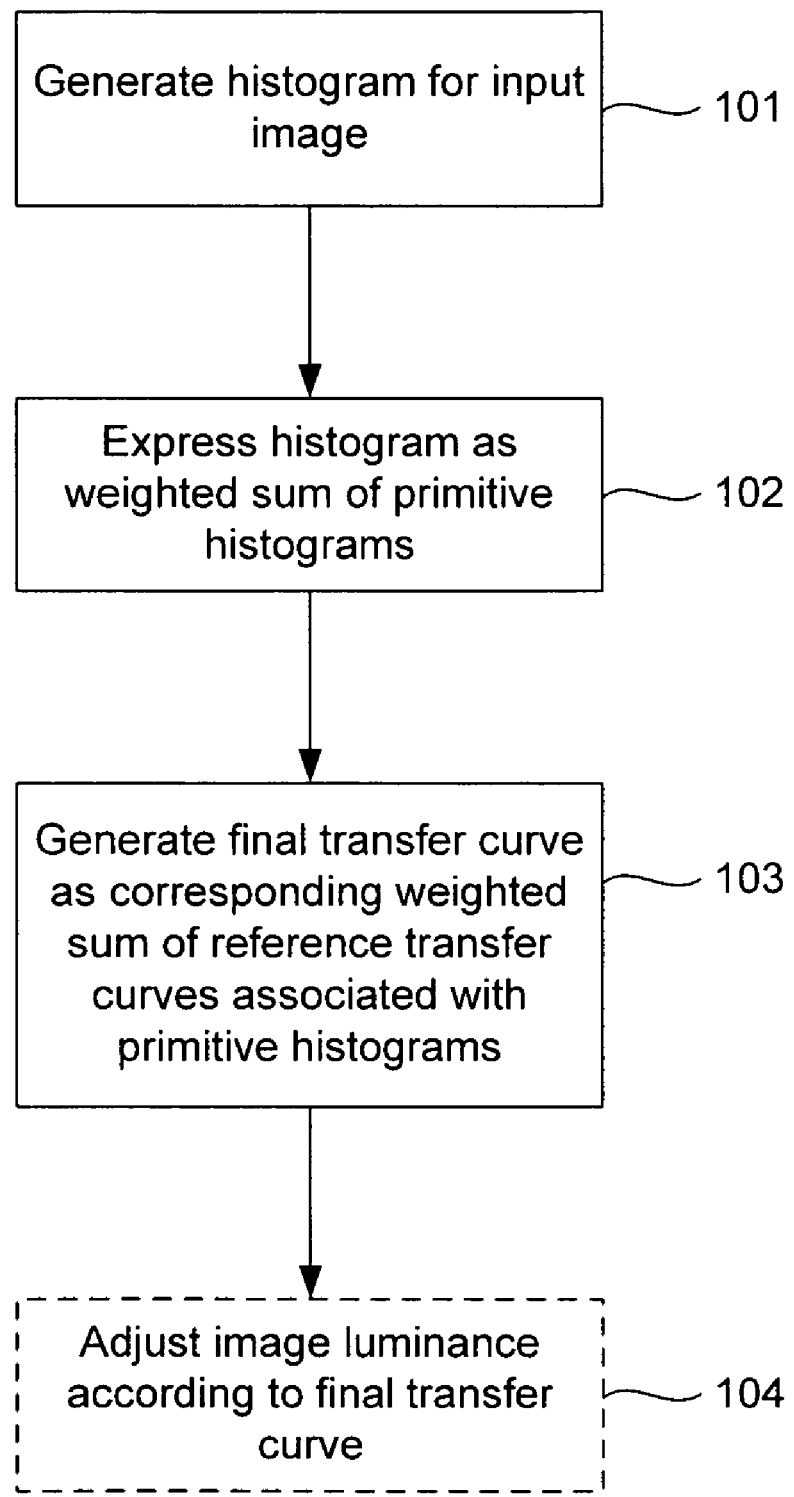
FIG. 6 is a flowchart illustrating a method for adaptively enhancing the contrast of an image, in accordance with an embodiment of the present invention.

FIG. 6 is a flowchart illustrating a method for adaptively enhancing the contrast of an image, in accordance with an embodiment of the present invention. Given an input image, generate 101 a histogram and express 102 the histogram as a weighted sum of primitive histograms. Then generate 103 a final transfer curve as a corresponding weighted sum of the reference transfer curves associated with the primitive histograms. Once the final transfer curve is generated, the image luminance can be adjusted 104 accordingly.

For smooth contrast enhancement in a sequence of images (such as in a video stream), the final transfer function can be generated based on the cumulative image content of the most recent frames. One implementation of this technique comprises accumulating the histograms of the most recent set of frames and computing their average. The resulting average histogram is then expressed as a weighted sum of primitive histograms, producing a final transfer function as described above. When implementing such an averaging technique, a buffer of 5 to 15 frames has been found to work well.

One advantage of the present invention is faster development of the reference transfer curves. A given reference transfer curve corresponding to a given primitive histogram needs only be verified on images that have luminance histograms similar to the given primitive histogram. In the above example set of nine primitive histograms, only nine corresponding transfer curves need to be designed and thusly verified. This dramatically cuts development time, since the reference transfer curves do not need to be verified and optimized against many hours of material encompassing many different primitive histograms in order to discover side effects due to interdependence of reference transfer curves.

Another advantage of the present invention is a reduced need for hardware resources. Generally, a transfer function may be generated by an apparatus comprising a controller for approximating an image luminance histogram by a first weighed sum of a set of primitive histograms, each primitive histogram associated with a corresponding reference transfer function from a set of reference transfer functions, and generating a final transfer function expressed as a second weighted sum of a set of reference transfer functions, wherein the reference transfer functions in the second weighted sum are weighted according to the associated primitive histograms in the first weighted sum. Using the above example of only 3 luminance histogram ranges (or histogram "bins"), it is possible to achieve contrast enhancement performance comparable to or better than using 8 or 16 bins in a traditional contrast enhancement approach.

Figure 4A:
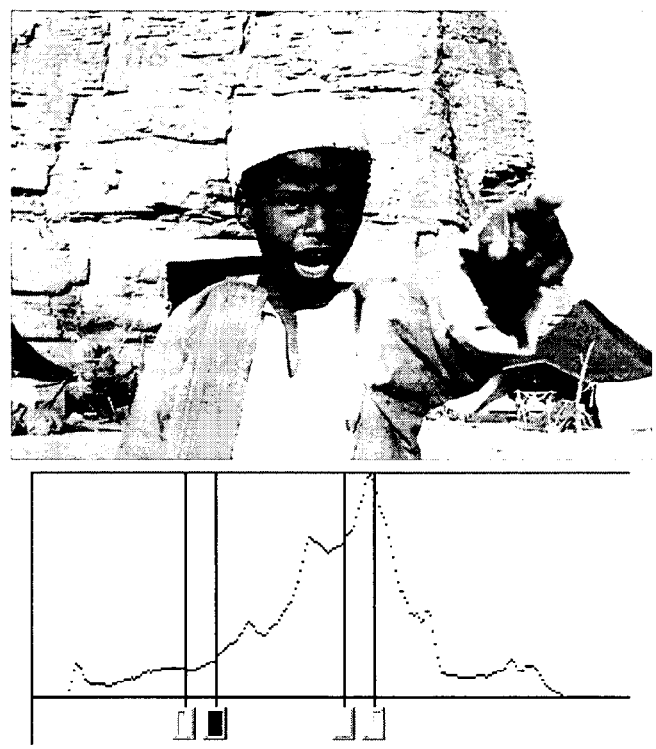
FIG. 4a shows an example input image and associated histogram.
Figure 4B:
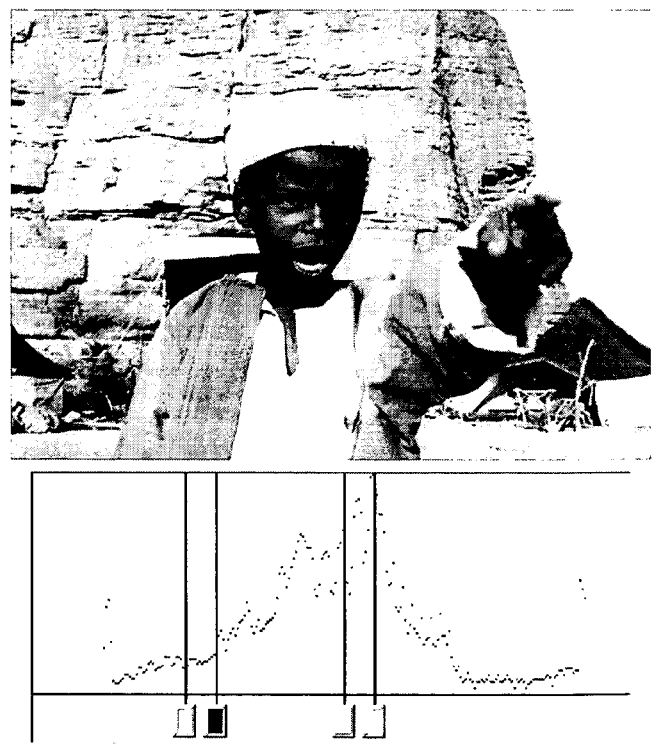
FIG. 4b shows a contrast enhanced version of the image and associated histogram, in accordance with an embodiment of present invention.

Another advantage of the present invention is improved contrast dynamic range without sacrificing the luminance resolution of the image. By way of example, an input original image and associated histogram are shown in FIG. 4a, and the enhanced output image and associated histogram are shown in FIG. 4b. Note that in the luminance histogram of the enhanced image, the dark and bright pixels are spread out further (i.e. increased dynamic range), whereas the medium-luminance pixels are mostly unaffected.

While the invention has been described in the context of displaying an image on a digital display device, it should be appreciated that the same techniques can be used in an environment where the adaptive contrast enhancement is limited to a region in the display. By way of example, adaptive contrast enhancement for a movie may exclude the upper and lower black bands that run horizontally across the display or screen. By way of another example, adaptive contrast enhancement may be restricted to a user-definable region of the display, such as a window or a physical region of the display.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

I claim:

1. A method executed by a computer for enhancing the contrast of a digital image, the method comprising:
   determining, by a computer, a source histogram of pixel luminance values that defines a pixel distribution in a plurality of luminance ranges for the digital image;
   identifying at least two primitive histograms from a set of primitive histograms that each define a pixel distribution in a plurality of luminance ranges;
   calculating a weighted sum in which each of the at least two primitive histograms is allocated a weighted value that minimizes a difference between each of the at least two primitive histograms and the source histogram;
   generating a transfer function that maps input luminance to output luminance in accordance with the calculated weighted sum; and
   applying, by the computer, the transfer function to the pixel luminance values to enhance the contrast of the digital image, wherein the transfer function is non-linear and applied across each of the luminance ranges represented in the source histogram to modify luminance values along a transfer curve.

2. The method of claim 1, wherein each primitive histogram is associated with a reference transfer function from a set of reference transfer functions.

3. The method of claim 2, wherein a first reference transfer function from the set of reference transfer functions decreases luminance in dark image regions without substantially altering luminance in medium-luminance and high-luminance image regions, and wherein the first reference transfer function is associated with a primitive histogram that indicates predominantly bright images.

4. The method of claim 2, wherein a first reference transfer function from the set of reference transfer functions increases luminance in bright image regions without substantially altering luminance in medium-luminance and low-luminance image regions, and wherein the first reference transfer function is associated with a primitive histogram that indicates predominantly dark images.

5. The method of claim 2, wherein the sum of weighted primitive histograms comprises at most two primitive histograms with positive weights, and wherein the sum of weighted reference transfer functions comprises at most two reference transfer functions with corresponding equal positive weights.

6. The method of claim 2, wherein the sum of weighted primitive histograms comprises at most three primitive histograms with positive weights, and wherein the sum of weighted reference transfer functions comprises at most three reference transfer functions with corresponding equal positive weights.

7. A computer configured to perform a method for enhancing the contrast of a digital image, comprising:
a memory for storing data;
a processing unit communicatively coupled to the memory, wherein the processing unit executes instructions for:
determining a luminance histogram, that defines a pixel distribution in a plurality of luminance ranges for the digital image;
identifying at least two primitive histograms from a set of primitive histograms that each define a pixel distribution in a plurality of luminance ranges;
calculating a weighted sum in which each of the at least two primitive histograms is allocated a weighted value that minimizes a difference between each of the at least two primitive histograms and the source histogram;
generating a transfer function that maps input luminance to output luminance in accordance with the calculated weighted sum; and
applying the transfer function to the pixel luminance values to enhance the contrast of the digital image, wherein the transfer function is non-linear and applied across each of the luminance ranges represented in the source histogram to modify luminance values along a transfer curve.

8. The computer of claim 7, further comprising a display unit for rendering the image.

9. The computer of claim 8, wherein the display unit is selected from the group consisting of an LCD screen, an OLED screen, a DLP screen, a CRT, and a plasma panel.

10. The computer of claim 7, wherein each primitive histogram is associated with a reference transfer function from the set of reference transfer functions.

11. The computer of claim 10, wherein a first reference transfer function from the set of reference transfer functions decreases luminance in dark image regions without substantially altering luminance in medium-luminance and high-luminance image regions, and wherein the first reference transfer function is associated with a primitive histogram that indicates predominantly bright images.

12. The computer of claim 10, wherein a first reference transfer function from the set of reference transfer functions increases luminance in bright image regions without substantially altering luminance in medium-luminance and low-luminance image regions, and wherein the first reference transfer function is associated with a primitive histogram that indicates predominantly dark images.

13. The computer of claim 10, wherein the weighted sum of primitive histograms comprises at most two primitive histograms with positive weights, and wherein the weighted sum of reference transfer functions comprises at most two reference transfer functions with corresponding equal positive weights.

14. The computer of claim 10, wherein the weighted sum of primitive histograms comprises at most three primitive histograms with positive weights, and wherein the weighted sum of reference transfer functions comprises at most three reference transfer functions with corresponding equal positive weights.

15. A computing system for adjusting the luminance of an image comprising:
a controller configured to:
identify a source histogram of pixel luminance values that defines a pixel distribution in a plurality of luminance ranges for the image and at least two primitive histograms from a set of primitive histograms that are most similar to the source histogram;
calculate a weighted sum in which each of the at least two primitive histograms is allocated a weighted value that minimizes a difference between each of the at least two primitive histograms and the source histogram;
generate a transfer function that maps input luminance to output luminance according to the calculated weighted sum;
an application configured to:
apply the transfer function to the pixel luminance values to enhance the contrast of the digital image, wherein the transfer function is non-linear and applied across each of the luminance ranges represented in the source histogram to modify luminance values along a transfer curve;
cause a display unit to render the digital image.

16. The computing system of claim 15, wherein the controller is further configured to identify reference transfer functions from the set of reference transfer functions that are associated with the at least two primitive histograms.

17. The computing system of claim 16, wherein a first reference transfer function from the set of reference transfer functions decreases luminance in dark image regions without substantially altering luminance in medium-luminance and high-luminance image regions, and wherein the first reference transfer function is associated with a primitive histogram that indicates predominantly bright images.

18. The computing system of claim 16, wherein a first reference transfer function from the set of reference transfer functions increases luminance in bright image regions without substantially altering luminance in medium-luminance and low-luminance image regions, and wherein the first reference transfer function is associated with a primitive histogram that indicates predominantly dark images.

19. The computing system of claim 16, wherein the sum of weighted primitive histograms comprises at most two primitive histograms with positive weights, and wherein the sum of weighted reference transfer functions comprises at most two reference transfer functions with corresponding equal weights.

20. The computing system of claim 16, wherein the sum of weighted primitive histograms comprises at most three primitive histograms with positive weights, and wherein the sum of weighted reference transfer functions comprises at most three reference transfer functions with corresponding equal weights.

* * * * *